Patented May 4, 1948

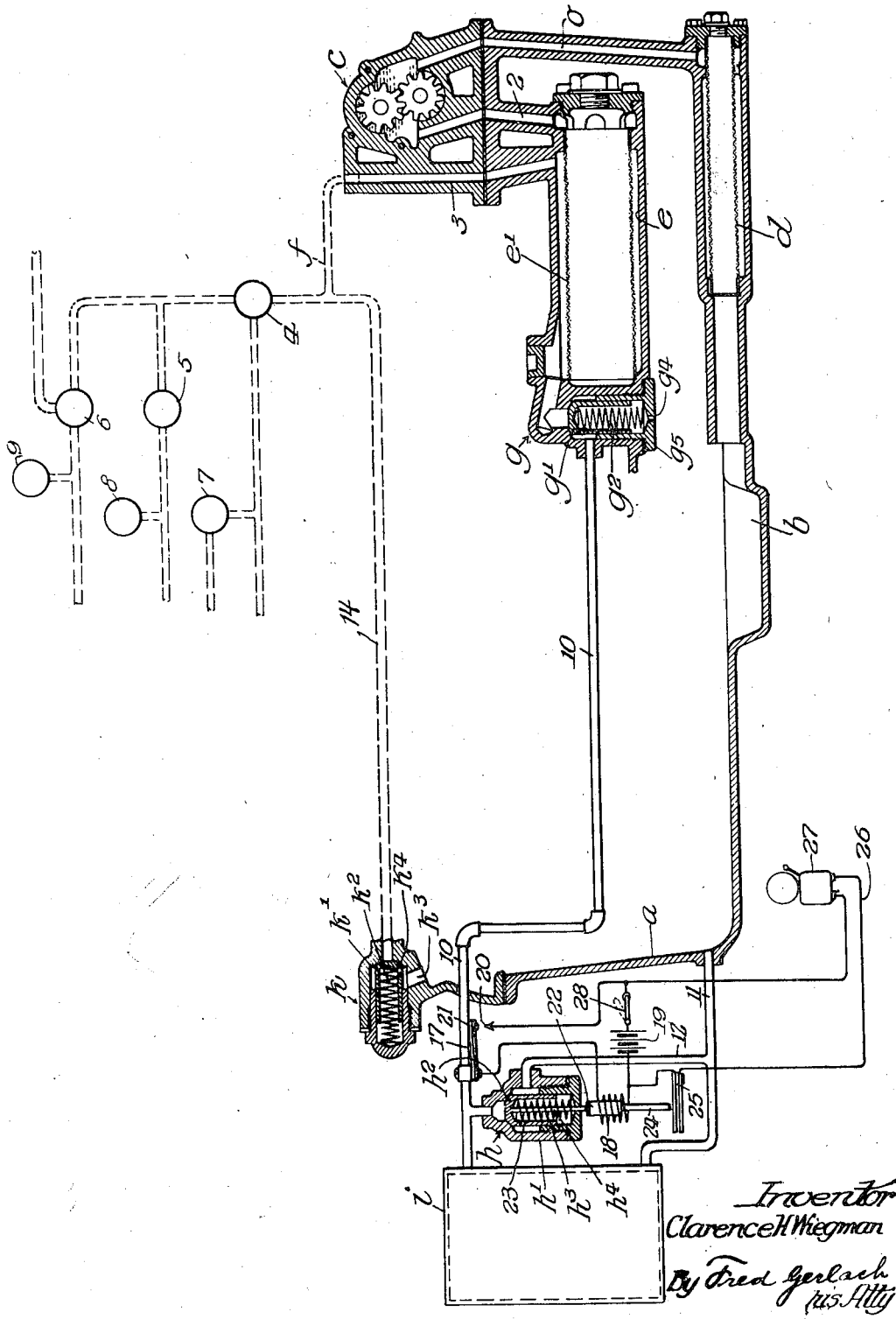

2,440,883

UNITED STATES PATENT OFFICE 2,440,883

LUBRICATING SYSTEM FOR INTERNAL-COMBUSTION ENGINES

Clarence H. Wiegman, Williamsport, Pa., assignor to Avco Manufacturing Corporation, a corporation of Delaware Application February 24, 1943, Serial No. 476,904

2 Claims. (Cl. 184—6)

The invention relates generally to lubricating systems and is especially adaptable for lubricating systems of internal combustion engines.

In pressure lubricating systems for internal combustion engines it has been the practice to pump, at normal engine operating speeds, a greater quantity of oil than is required to lubricate the engine in order to insure the delivery of sufficient oil for pressure lubrication at low engine speeds. Positive displacement oil pumps are usually used for supplying this oil to the lines or conduits which deliver oil to lubricate the various parts of the engine and the parts associated therewith which require lubrication. To relieve the conduits of the excess oil and to prevent an abnormally high oil pressure in the oil supplying conduits, a valve which is responsive to pressure in the conduit is provided to by-pass the excess oil and to maintain the oil pressure in the supplying conduits at the predetermined desired value. It has also been the practice to cool the lubricating oil by circulating the engine-lubricating oil at the lubricating pressure through a radiator or cooler, before the oil has passed through the parts to be lubricated, and to return the oil to the usual sump in the bottom of the crankcase of the engine. In cooling the oil under this high pressure, the cooler or radiator is subjected to stresses which are likely to produce leaks or bursts in the cooler.

One object of the invention is to provide a lubricating system for internal combustion engines in which the flow of oil through the cooler or radiator will be at a sufficiently low pressure to avoid stresses which are likely to produce leaks or bursts.

In practice it has also been found that with a given radiator, the cooling efficiency may be increased by lowering the velocity of the oil flowing through the cooler and directly cooling the by-passed oil, in lieu of the oil supplied to the engine lubricating system. Another object of the invention is to provide in such a lubricating system means to cause the oil to flow around the cooler or radiator when its temperature is below a predetermined degree to facilitate the heating thereof during cold engine operations.

Another object of the invention is to provide a pressure lubricating system for internal combustion engines in which the oil is by-passed around the cooler in the event that the oil becomes clogged or frozen in the radiator or the pressure of the oil in the delivery line to the radiator exceeds the desired pressure.

Another object of the invention is to provide a lubricating system which is efficient and dependable and which makes it possible to avoid excessive weight of the cooler, which are important and desirable factors in engines used for aircraft.

Other objects of the invention will appear from the detailed descriptions.

The invention consists in the several novel features which are hereinafter set forth and more particularly defined by claims at the conclusion hereof.

The drawing illustrates a lubricating system embodying the invention in an internal combustion engine.

The invention is exemplified in connection with the crankcase $a$ of an internal combustion engine. This case contains oil for the lubricating system and is provided with an oil sump $b$ from which the oil is drawn by a gear pump $c$ which forces the oil through the system from which it is returned to the sump for recirculation. The pump $c$ draws oil from the sump $b$ through a suction-screen $d$ and a duct $o$ which is usually formed in the crankcase. The pump $c$ delivers oil under pressure through a duct 2 to a casing $e$ which contains a screen $e^1$. The oil, after passing through the screen $e^1$, is forced from the casing $e$ through a duct 3 which is connected to a pipe $f$ which functions as a conduit for delivering oil through its connections and branches to all of the parts to be lubricated, as well understood in the art. For example, the line $f$ may be connected to oil headers diagrammatically indicated at 4, 5 and 6, crankshaft bearings diagrammatically indicated at 7, camshaft bearings diagrammatically indicated at 8 and 9, and by branches to the other parts of the engine which are usually lubricated. In practice, some of the ducts may be integrally formed in the crankcase, but for clarity in illustration they have not been so shown. The oil from the lubricated parts is returned to the crankcase by suitable return connections (not shown), as well understood in the art.

The pump $c$ is driven from the crankshaft of the engine in the usual manner and its capacity at all normal engine operating speeds is sufficient to deliver a greater quantity of oil to the conduit $f$ than that required or deemed desirable for the proper lubrication of the parts, which, if not compensated for, would result in an excess of pressure in the oil conduit $f$. The excess oil is by-passed to maintain the proper predetermined pressure in the conduit $f$ for lubricating the parts, and this is effected by a pressure-responsive valve $g$ which by-passes its outflow through a pipe 10 to a radiator or cooler $i$ which may be of any suitable construction. From the cooler $i$ the oil is returned to the crankcase $a$ by the pipe 11. The valve $g$ comprises a closure member $g^1$ which is closed by a spring $g^2$ of a valve which will permit the outflow from casing $e$ of the excess or sufficient oil to reduce the pressure in said casing which is produced by the pump $c$ to the normal desired predetermined pressure for the lubrication of the parts, for example, 70 lbs. per square inch. A bleed-port $g^4$ is provided in the cap $g^5$ of the valve $g$. Under normal conditions this valve $g$ acts to continuously maintain said predetermined pressure in the casing $e$ and the oil delivery line $f$. The flow of oil through the cooler or radiator $i$ is sufficiently unrestricted so that pressure drop at normal flow is, for example, approximately 5 lbs. per square inch. The by-pass valve $g$ is placed in one end of the screen-casing $e$. The oil which flows to the cooler $i$ from the by-pass valve $g$ consists of the excess oil forced by the pump $c$, and its flow through the cooler is substantially unrestricted. The valve $g$ permits the oil, when the pressure of the oil from pump $c$ to the line $f$ for the parts to be lubricated exceeds 70 lbs. p. s. i., to flow to the pipe 10. The safety valve $k$, hereinafter described, limits the pressure of the oil in the pipe $f$ and against the valve $g$ to 90 lbs. p. s. i. As a result, the excess oil flowing from the valve $g$ to the pipe 10 to the cooler consists of the differential between 70 and 90 lbs. p. s. i., and has a relatively low pressure. The oil from the cooler is returned to the sump for recirculation with the return oil from the engine and produces a low overall temperature of the oil being circulated. This relatively low pressure of the oil to the cooler avoids high pressure-stresses in the cooler structure so that a saving of weight can be effected in its construction without danger of producing leaks or breaks.

It is also advantageous to prevent abnormal stresses in the cooler-structure when an obstruction prevents the free flow of oil through the cooler or in the event of abnormally high pressure of the oil in the casing $e$ as the result of a stoppage or abnormal retardation of oil through the parts being lubricated. A pressure-responsive valve $h$ is connected to receive oil from pipe 10 and is adapted to by-pass the oil around radiator $i$ to the pipe 12 and to pipe 11 which discharges into the crankcase $a$. This valve comprises a casing $h^1$, a closure-member $h^2$, and a spring $h^3$ which normally holds the valve closed and is adapted to permit the closure member $h^2$ to open when an abnormal increase of pressure of the oil occurs in the pipe 10. A bleed-port 23 is provided in the annular skirt of member $h^2$. A stem $h^4$ is secured to member $h^2$. In the event of an obstruction in the radiator or cooler $i$ which retards the outflow of oil therefrom, the pressure of oil in the line 10 will be increased. This increase in pressure will automatically open the valve $h$ and by-pass oil around the cooler from pipe 10 to pipe 12 from which it will flow through pipe 11 back to the crankcase $a$ and the sump $b$. In the event of a substantial increase in pressure of the oil in the pipe 10, which occurs if the cooler becomes obstructed or from any other cause, such increase of pressure in pipe 10 will automatically open the valve $h$ and by-pass oil around the cooler from pipe 10 to pipe 12 which returns the by-passed oil to the sump $b$. The cooler structure will not be subjected to abnormally high pressure stresses either when the cooler becomes obstructed or the pressure in pipe 10 becomes excessive from any other cause.

The invention also includes means for returning to the sump without cooling, the oil by-passed by valve $g$ when the temperature of said oil is so low that cooling of the oil is not desired, for example, in starting the engine or when the engine is operating in extremely cold regions. This means includes a thermostat 17 which may be clamped to the pipe 10, a solenoid coil 18 which is connected to a circuit which includes a battery 19, a normally open contact 20, which closes the circuit and is responsive to the thermostat, and an armature 22 which is shiftable by the coil 18, and connected to the stem $h^4$ of the member $h^2$ of the valve $h$. When the temperature of the oil flowing through the pipe 10 is reduced so that no cooling is desired, the thermostat 17 will engage contacts 20 and 21 and close the circuit through coil 18 which when energized will shift armature 22 which is attached to the stem $h^4$ of the valve member $h^2$. The valve $h$ will then be opened and the oil in pipe 10 will flow through the casing of the valve $h$ and pipe 12 to the sump of the engine.

In the event of an obstruction in the cooler which will increase the pressure of oil in pipe 10 from valve $g$, or a substantial increase in pressure in pipe 10 by an excessive outflow from valve $g$, or when the temperature of oil in pipe 10 is so low that the pressure of oil in said pipe is increased, and valve $h$ is opened to by-pass oil around the cooler to the sump, it is important that the pilot of an airplane should be informed of any of these conditions. For this purpose a stem 24 is secured to and insulated from the armature 22 and is adapted to close a switch 25 in an electric circuit 26 for the actuation of an alarm or signal device 27, whenever the valve $g$ is opened. A manual cut-off switch 28 is included in the circuits for the thermostat 17 and the signal device 27.

A safety valve $k$ is connected by a line or duct 14 to receive oil of the pressure in the delivery line $f$, for relieving the pressure in the event that it becomes abnormally excessive. This valve $k$ comprises a closure member $k^1$ and a spring $k^2$ which is loaded to permit the valve to be opened by a predetermined pressure of oil in excess of the normal pressure to be maintained in the delivery line $f$. A bleed-port $k^4$ is provided in the skirt of member $k^1$. The oil passing through valve $k$ flows through a duct $k^3$ into the crankcase $a$. The valve $k$ is responsive, for example, when the lubricating pressure to be maintained is 70 lbs. per square inch to a pressure of 90 lbs. per square inch, so that it will function solely as a safety valve in the event that the pressure should, through some abnormal condition, become abnormally excessive in the lubricating lines.

The operation of the system will be as follows: Under normal operation of the engine and its variations in speed, the pump $c$ will force oil under pressure in sufficient volume to produce, in the casing $e$, an excess over the normal predetermined pressure of 70 lbs. per square inch, at which oil is to be delivered to the parts of the engine which require lubrication. When the pressure of the oil in casing $e$ produced by the pump $c$ and flowing to the conduit $f$ increases above 70 lbs. p. s. i., the valve $g$ will open just enough to allow the excess oil over said pressure to flow through conduit 10 to the cooler. The throttling action of valve $g$ causes a drop in the pressure in pipe 10, since only the oil in excess of 70 lbs. p. s. i. is discharged by valve $g$ so that the oil in conduit 10 flowing to the cooler will be of low pressure relatively to the pressure in the conduit $f$. The valve $g$ is adapted to discharge oil over the lubricating pressure of 70 lbs. p. s. i. to the cooler. The flow capacity of the conduit 10, cooler $i$ and conduit 11 is sufficient is that a very low pressure will suffice to force oil from pipe 10 through the cooler i and conduit 11 to the sump. In normal operation the safety valve k remains closed but will open in the event that during abnormal conditions the pressure in the conduit f rises to, or over, 90 lbs. p. s. i, the excess will be discharged from conduit f, and the pressure in the conduit 10, which conducts oil to the cooler, cannot exceed the differential between 70 and 90 lbs., p. s. i. If, through some abnormal cause, valve g should become stuck or conduit 10 should become clogged, or pump c produces a pressure in conduit f in excess of 90 lbs. p. s. i., the valve k will open and limit the pressure in conduit f to 90 lbs. p. s. i. In normal operation the oil of dropped pressure flowing from valve g to the cooler will be cooled and then flow through conduit 11 to the sump where it is mixed with the warm oil returned to the sump from the lubricated parts. The flow of the oil through the cooler under the dropped pressure results in efficient cooling of the oil. At low temperature the oil will increase in viscosity and the pressure necessary to force the oil of dropped pressure through the cooler i will increase. If the temperature of the oil is such as to cause a predetermined pressure increase, the thermostat 17 will cause the valve h to open and by-pass a portion or all of the oil around the cooler i and return it to the sump. If the cooler i should become obstructed, the pressure in the conduit 10 will be increased and the valve h which is responsive to such an increase in pressure, will be opened and by-pass the oil around the cooler and return the oil to the sump. In this manner undesirable strains in the cooler structure will be effectively avoided. For this purpose the valve h is adapted to respond to predetermined variations in the pressure of the oil of dropped pressure from valve g. Whenever valve h is opened from any cause, the switch 25 will be closed to operate the signalling device 27 to inform the pilot of an airplane of the abnormal conditions caused by the increase of pressure in the conduit to the cooler.

The invention exemplifies a lubricating system for internal combustion engines in which the lubricating oil is subjected to pressure by the engine-driven pump in excess of the predetermined pressure desired for the proper lubrication of the parts, said pressure is reduced normally and maintained at said predetermined pressure, and only the surplus or excess oil is circulated through the cooler to produce more efficient cooling of the oil for reuse and for avoiding high stresses in the cooler-structure. The invention also exemplifies such a lubrication system in which provision is made for automatically by-passing the oil around the cooler to the crankcase in the event that the cooler becomes obstructed, or the temperature of the oil is so low that no cooling is desired.

The invention is not to be understood as restricted to the details set forth, since these may be modified within the scope of the appended claims without departing from the spirit and scope of the invention.

Having thus described the invention, what I claim as new and desire to secure by Letters Patent is:

1. A lubricant circulation system for internal combustion engines, comprising: an engine sump for containing a supply of oil; a driven pump for delivering oil under pressure in excess of the pressure desired for lubrication of the parts; a line for delivering oil from the pump to the parts to be lubricated; an oil cooler; an automatic pressure-responsive valve for the oil in the line and discharging from the line only oil in excess of the predetermined pressure desired for lubrication and producing a drop in pressure in the excess oil discharged; a constantly open conduit between the automatic pressure-responsive valve and the cooler for delivering only the excess oil to the cooler; a constantly open conduit for delivering oil from the cooler to the sump; a normally closed automatic by-pass valve between the conduits and responsive to a predetermined increase pressure of the oil in the conduit between the automatic pressure-responsive valve and the cooler; means for delivering oil discharged from the by-pass valve to the conduit between the cooler and the sump; and an automatic pressure-limiting valve connected to the line for limiting the excess of pressure in the line and the oil passing through the pressure-responsive valve to the cooler.

2. A lubricant circulation system for internal combustion engines, comprising: an engine sump for containing a supply of oil; a driven pump for delivering oil under pressure in excess of the pressure desired for lubrication of the parts; a line for delivering oil from the pump to the parts to be lubricated; an oil cooler; an automatic pressure-responsive valve for the oil in the line and discharging from the line only oil in excess of the predetermined pressure desired for lubrication and producing a drop in pressure in the excess oil discharged; a constantly open conduit between the automatic pressure-responsive valve and the cooler for delivering only the excess oil to the cooler; a constantly open conduit for delivering oil from the cooler to the sump; a normally closed automatic by-pass valve between said conduits and responsive to a predetermined increase pressure of the oil in the conduit between the automatic pressure-responsive valve and the cooler; means for delivering oil discharged from the by-pass valve to the conduit between the cooler and the sump; a thermostat responsive to the temperature of the oil in the conduit between the pressure-responsive valve and the cooler; and electrical means controlled by the thermostat for opening the by-pass valve when the temperature of the oil in the conduit between the pressure-responsive valve and the cooler attains a predetermined low value.

CLARENCE H. WIEGMAN.

REFERENCES CITED

The following references are of record in the file of this patent:

UNITED STATES PATENTS

| Number | Name | Date |
| --- | --- | --- |
| 1,860,150 | Loeffler | May 24, 1932 |
| 1,891,006 | Norman | Dec. 13, 1932 |
| 1,999,237 | Hobbs | Apr. 30, 1935 |
| 2,012,613 | Loeffler | Aug. 27, 1935 |
| 2,072,180 | Paton | Mar. 2, 1937 |
| 2,268,359 | Tustin | Dec. 30, 1941 |
| 2,275,576 | Ware | Mar. 10, 1942 |

FOREIGN PATENTS

| Number | Country | Date |
| --- | --- | --- |
| 3,647 | Great Britain | Feb. 12, 1913 |
| 250,196 | Italy | Sept. 18, 1926 |
| 594,527 | Germany | Mar. 17, 1934 |
| 723,197 | France | Jan. 12, 1932 |